US012287027B2

(12) United States Patent
Voges

(10) Patent No.: US 12,287,027 B2
(45) Date of Patent: Apr. 29, 2025

(54) REVERSE DRIVE ASSEMBLY FOR MOTORIZED VEHICLE

(71) Applicant: Harley-Davidson Motor Company, Inc., Milwaukee, WI (US)

(72) Inventor: Johann Voges, Brookfield, WI (US)

(73) Assignee: Harley-Davidson Motor Company, Inc., Milwaukee, WI (US)

( * ) Notice: Subject to any disclaimer, the term of this patent is extended or adjusted under 35 U.S.C. 154(b) by 0 days.

(21) Appl. No.: 18/331,057

(22) Filed: Jun. 7, 2023

(65) Prior Publication Data

US 2024/0410447 A1   Dec. 12, 2024

(51) Int. Cl.

| F16H 3/18 | (2006.01) |
|---|---|
| B62K 23/02 | (2006.01) |
| B62K 23/08 | (2006.01) |
| B62M 11/06 | (2006.01) |
| F02N 11/08 | (2006.01) |
| F16H 3/00 | (2006.01) |
| F16H 59/02 | (2006.01) |
| F16H 59/10 | (2006.01) |

(52) U.S. Cl.
CPC ............. *F16H 3/18* (2013.01); *B62K 23/02* (2013.01); *B62K 23/08* (2013.01); *B62M 11/06* (2013.01); *F02N 11/0851* (2013.01); *F16H 3/006* (2013.01); *F16H 59/10* (2013.01); *F16H 2059/0256* (2013.01); *F16H 59/0278* (2013.01)

(58) Field of Classification Search
CPC . F16H 3/18; F16H 3/006; F16H 59/10; F16H 59/0278; F16H 2059/0256; B62K 23/02; B62K 23/08; B62M 11/06; F02N 11/0851

USPC ........................................................ 74/665 B
See application file for complete search history.

(56) References Cited

U.S. PATENT DOCUMENTS

| 3,872,738 A | 3/1975 | Price et al. |
|---|---|---|
| 4,763,538 A | 8/1988 | Fujita et al. |

(Continued)

FOREIGN PATENT DOCUMENTS

| CN | 117799743 A | 4/2024 |
|---|---|---|
| CN | 117799744 A | 4/2024 |

(Continued)

OTHER PUBLICATIONS

YamahaDTCanadaServic, "13 Sure Park," <https://www.youtube.com/watch?v=ul9Mv3jAPJs> YouTube video dated Sep. 26, 2017 (1 page).

(Continued)

*Primary Examiner* — Ha Dinh Ho
(74) *Attorney, Agent, or Firm* — Michael Best & Friedrich LLP

(57) ABSTRACT

A motorized vehicle has an engine operable to drive the motorized vehicle in a forward direction, a starter motor having an output shaft extending between a first end and a second end, the first end selectively engageable with the engine to start the engine, and a transmission having a main shaft with a main shaft gear and an output drive wheel. A reverse drive assembly includes an input and an output. The input is in constant mesh with the second end of the starter motor. The output is selectively engageable with the main shaft gear of the transmission to drive the motorized vehicle in a reverse direction.

19 Claims, 14 Drawing Sheets

(56) References Cited

U.S. PATENT DOCUMENTS

| | | | |
|---|---|---|---|
| 4,827,148 A | 5/1989 | Hirosawa et al. | |
| 5,036,939 A | 8/1991 | Johnson et al. | |
| 5,845,546 A * | 12/1998 | Knowles | B60K 23/04 |
| | | | 74/650 |
| 5,971,123 A | 10/1999 | Ochab et al. | |
| 6,209,697 B1 | 4/2001 | Austin | |
| RE38,012 E | 3/2003 | Ochab et al. | |
| 6,622,837 B2 | 9/2003 | Ochab et al. | |
| 6,629,590 B2 | 10/2003 | Ochab et al. | |
| 6,722,484 B2 | 4/2004 | Ochab et al. | |
| 7,141,162 B2 * | 11/2006 | Garner | B03B 9/02 |
| | | | 209/729 |
| 7,610,979 B1 | 11/2009 | Dykowski et al. | |
| 7,952,305 B2 | 5/2011 | Fischer et al. | |
| 8,677,860 B2 * | 3/2014 | Nishida | B60K 6/387 |
| | | | 74/665 B |
| 8,840,514 B1 | 9/2014 | Knickerbocker et al. | |
| 8,857,294 B2 | 10/2014 | Brewer et al. | |
| 8,857,589 B2 | 10/2014 | Heath et al. | |
| 8,919,513 B2 | 12/2014 | Heath et al. | |
| 8,926,467 B2 | 1/2015 | Grant | |
| 9,022,195 B2 | 5/2015 | Heath et al. | |
| 9,272,620 B2 | 3/2016 | Knickerbocker et al. | |
| 9,360,059 B2 | 6/2016 | Palmer et al. | |
| 9,856,930 B2 | 1/2018 | Heath et al. | |
| 10,457,140 B2 * | 10/2019 | Bennett | B60K 17/08 |
| 10,989,258 B1 | 4/2021 | Coon et al. | |
| 11,047,464 B2 * | 6/2021 | Hamrin | F16H 48/34 |
| 11,131,350 B1 | 9/2021 | Palmer | |
| 11,236,811 B1 | 2/2022 | Hasson, Jr. et al. | |
| 11,364,788 B2 | 6/2022 | Ge et al. | |
| 11,421,769 B2 | 8/2022 | Heath et al. | |
| 2006/0266611 A1 | 11/2006 | Updyke et al. | |
| 2009/0199666 A1 * | 8/2009 | Yang | F16H 3/093 |
| | | | 74/331 |
| 2010/0077884 A1 | 4/2010 | Ono et al. | |
| 2019/0291567 A1 | 9/2019 | Huang et al. | |
| 2020/0062105 A1 | 2/2020 | Ge et al. | |
| 2023/0106079 A1 | 4/2023 | Fertilio | |

FOREIGN PATENT DOCUMENTS

| | | |
|---|---|---|
| CN | 117799745 A | 4/2024 |
| CN | 117799747 A | 4/2024 |
| CN | 117842249 A | 4/2024 |
| CN | 117842252 A | 4/2024 |
| CN | 222474372 U | 2/2025 |
| DE | 102009058133 B4 | 6/2020 |
| DE | 102020006375 A1 | 4/2022 |
| GB | 2079877 A | 1/1982 |
| JP | 2014108636 A | 6/2014 |

OTHER PUBLICATIONS

TechnoLogic, "Honda Goldwing: How to Reverse Correctly," <https://www.youtube.com/watch?v=igtirPnq8pE> YouTube video dated Dec. 28, 2017 (1 page).

Team Winnebagoland, "How to Use Sure Park Assist 2018 Yamaha Star Venture Transcontinental Touring Option," <https://www.youtube.com/watch?v=vvc23thZg-E> YouTube video dated Dec. 29, 2017 (1 page).

913 Boy, "Honda Goldwing Reverse Gear," <https://www.youtube.com/watch?v=gFMcdvG9c_s> YouTube video dated Jun. 5, 2021 (1 page).

BMW K1600 Forum, "Do NOT use reverse!" <https://www.k1600forum.com/threads/do-not-use-reverse.162106/pages-6> forum post dated Sep. 29, 2017 (10 pages).

Baker Drivetrain, "Baker Factory 5 Speed Reverse," F5R Installation Instructions, dated Dec. 3, 2018 (28 pages).

Baker Drivetrain, "F6R Factory 6-Speed Reverse System," F6R Transmission Kit information dated May 11, 2021 (36 pages).

European Patent Office Extended Search Report for Application No. 24179647.3 dated Nov. 11, 2024 (22 pages).

* cited by examiner

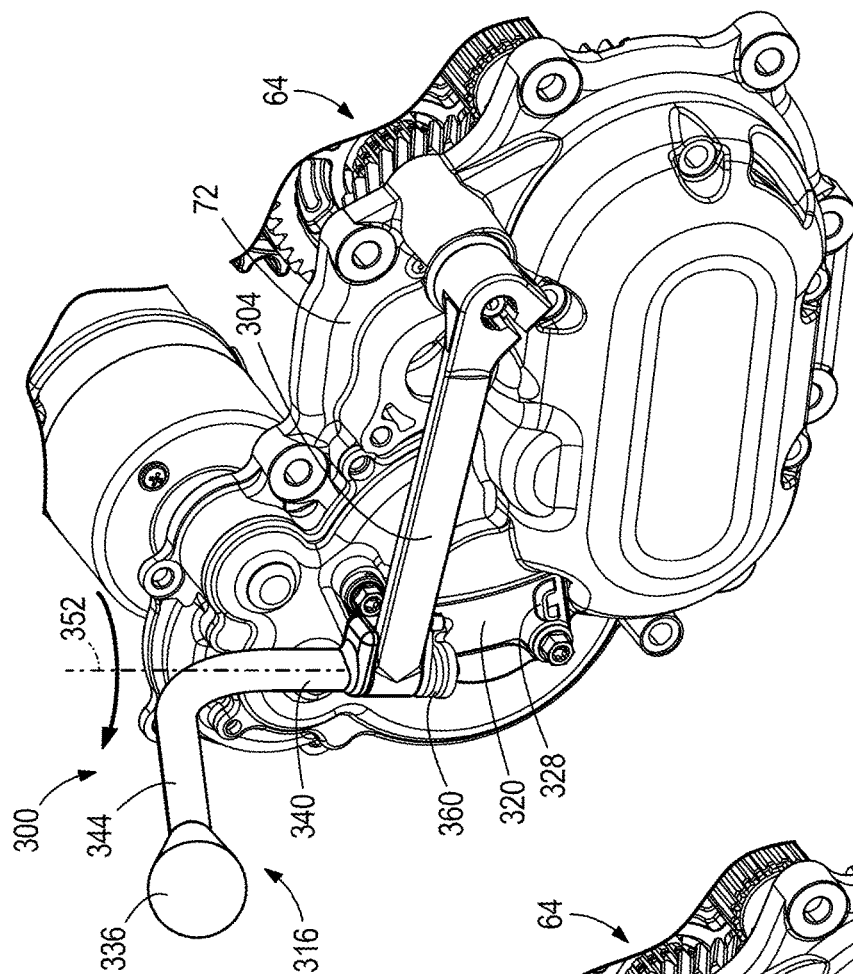
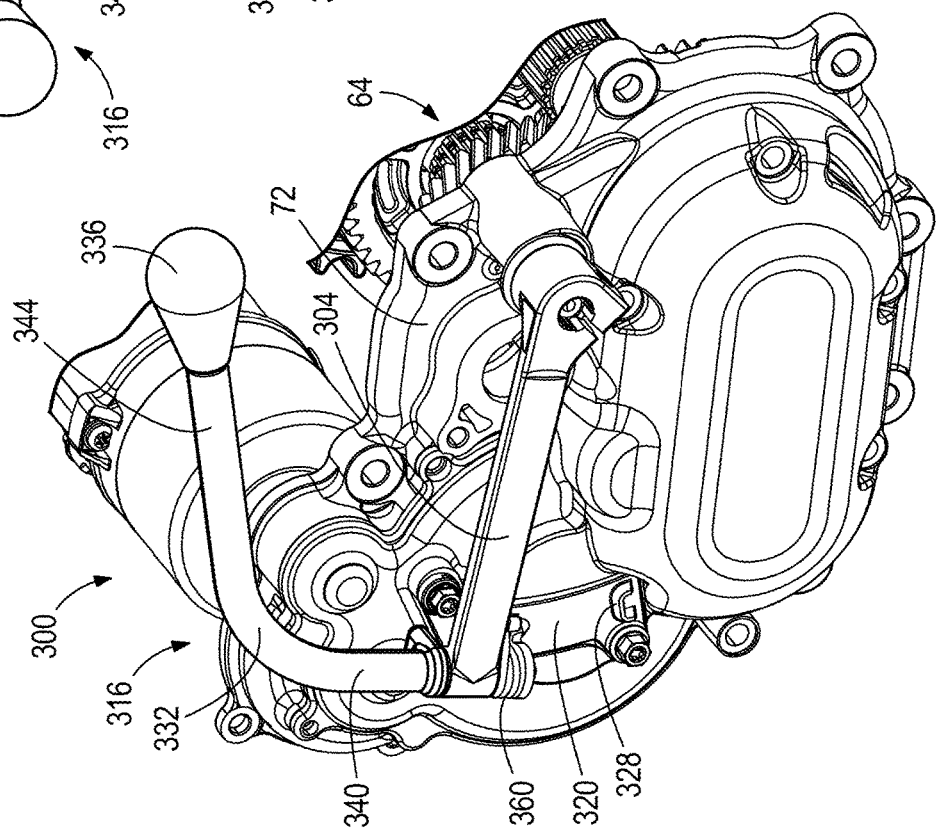
FIG. 8B
FIG. 8A

REVERSE DRIVE ASSEMBLY FOR MOTORIZED VEHICLE

BACKGROUND

The present disclosure relates to motorized vehicles, such as two or three wheeled motorcycles, and more particularly to parking assist drive systems for motorized vehicles. Some motorized vehicles may be relatively large and heavy. The size and weight of these vehicles may make it difficult for an operator to manually move the vehicle. As a result, these vehicles may be provided with a parking assist drive system, such as a reverse drive system, operable to propel the vehicle in a reverse direction at relatively slow speeds.

SUMMARY

In one aspect, the invention provides a motorized vehicle having an engine, a starter motor having a motor shaft, the motor shaft selectively coupled to the engine to start the engine, a transmission main shaft assembly including a main shaft gear provided on a main shaft and rotatable therewith, and a transmission counter shaft assembly including a plurality of gears supported on a counter shaft, wherein the transmission counter shaft assembly couples to the transmission main shaft assembly in multiple configurations to create multiple forward gear ratios. An output drive wheel is supported on the main shaft and drivable by the counter shaft and a forward power transmission path is established from the main shaft through the counter shaft to the output drive wheel. A reverse drive assembly includes a reverse drive gear train in constant mesh with the motor shaft of the starter motor, the reverse drive gear train including an output gear, and a pivot carrier carrying the output gear, the pivot carrier movable between an engaged position in which the output gear is meshed with the main shaft gear, and a disengaged position in which the output gear is spaced from the main shaft gear. In the engaged position a reverse power transmission path extends from the starter motor, through the reverse drive gear train to the main shaft, and in the disengaged position the reverse power transmission path is broken.

In another aspect, the invention provides a powertrain assembly for a motorized vehicle having an engine operable to drive the motorized vehicle in a forward direction. The powertrain assembly includes a starter motor having an output shaft extending between a first end and a second end, the first end selectively engageable with the engine to start the engine, and a transmission having a main shaft with a main shaft gear and an output drive wheel. A reverse drive assembly includes an input and an output, the input in constant mesh with the second end of the starter motor, and the output selectively engageable with the main shaft gear of the transmission to drive the motorized vehicle in a reverse direction.

In another aspect, the invention provides a method for operating a reverse drive on a motorized vehicle. The motorized vehicle includes an engine, a transmission, and a reverse drive assembly. The method includes moving a pivot carrier of the reverse drive assembly from a disengaged position to an engaged position, operating a starter motor to rotate a motor shaft, and driving a reverse drive gear train using the motor shaft, including driving an output gear mounted on the pivot carrier to rotate. The method also includes driving the transmission in reverse via the rotation of the output gear.

BRIEF DESCRIPTION OF THE DRAWINGS

FIG. 8A illustrates the lever assembly of FIG. 7 in a first stage of operation, with a lever arm locked in an upper position by a handle assembly in a locked position.

FIG. 8B illustrates the lever assembly of FIG. 7 in a second stage of operation, with the handle assembly pivoted to an unlocked position.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
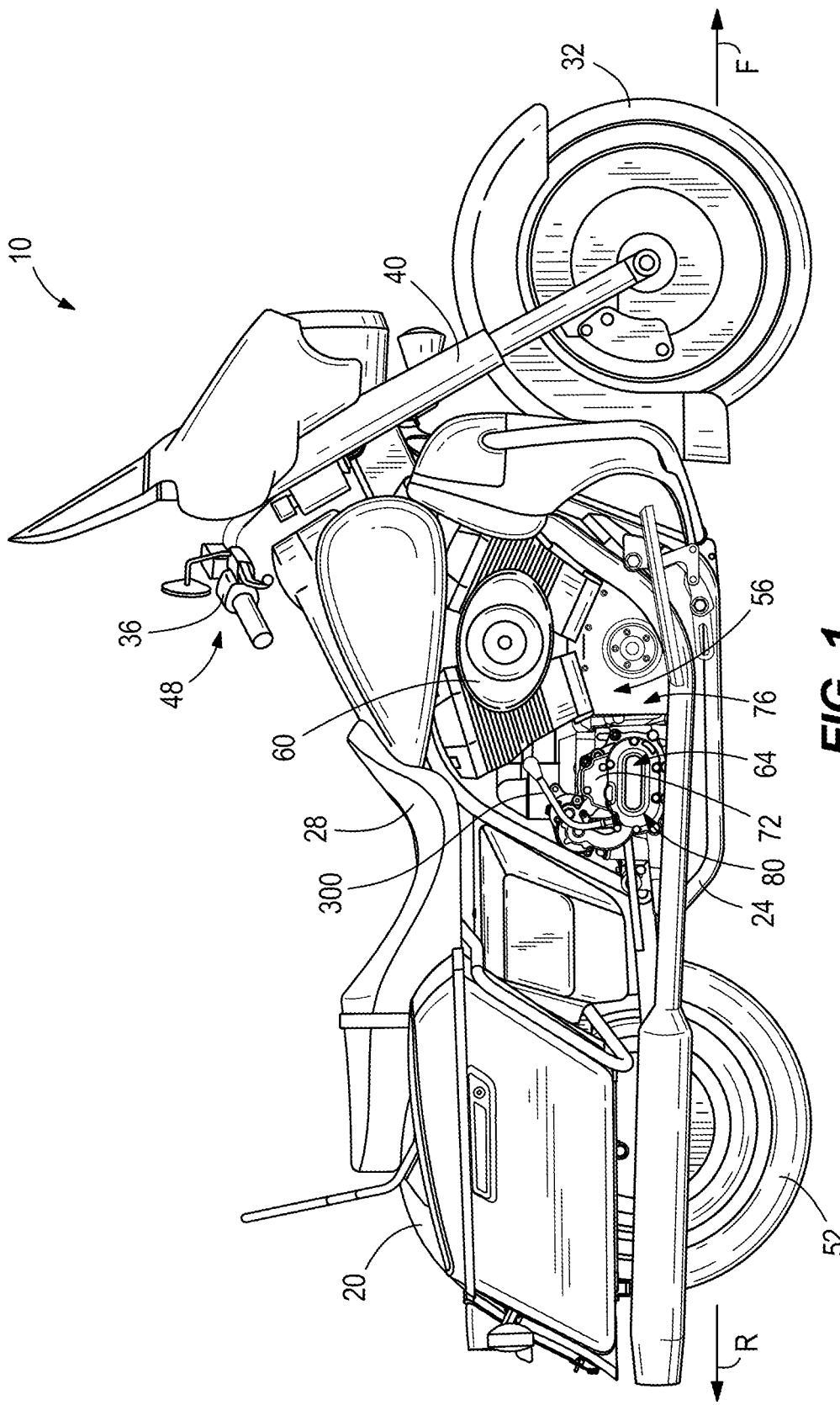
FIG. 1 is a side view of a motorized vehicle according to one embodiment of the present disclosure.

FIG. 1 illustrates a motorized vehicle 10 according to one embodiment. The motorized vehicle 10 is shown as a motorcycle 20 configured for operation by a straddling rider (e.g., an operator, not shown). The motorcycle 20 includes a frame 24, a seat 28 coupled to the frame 24 for receiving the operator and optionally a passenger, and a front wheel 32, the direction of which is controlled by the operator through manipulation of a handlebar 36. A fork assembly 40 extends between the handlebar 36 and the front wheel 32 and pivots with respect to the frame 24 to steer the motorcycle 20. A user interface 48 may be positioned on the handlebar 36. The user interface 48 may includes on or more control buttons, levers, and the like used to operate the motorcycle 20. Some components of the user interface 48 may connect to an electronic control system 50 (FIG. used to operate electronic components of the motorcycle 20.

The motorcycle 20 includes a single rear wheel 52 defining a single track with the front wheel 32, such that the rider is responsible for maintaining the balance of the motorcycle 20 with respect to the ground. In other constructions, the motorcycle 20 may include two rear wheels, in a known "trike" configuration that is self-stable. The rear wheel(s) 52 are driven by a powertrain assembly 56 of the motorcycle 20. The powertrain assembly 56 includes an engine 60 (e.g., an internal combustion engine) and a transmission assembly 64. The transmission assembly 64 is operably coupled to the rear wheel 52 to transmit torque to the rear wheel 52 to propel the motorcycle 20. In other constructions, the powertrain assembly 56 may additionally include an electric machine or another alternative energy source. According to FIG. 1, the motorcycle 20 is a touring motorcycle or so-called "heavyweight" motorcycle configured for long-distance touring. However, the motorcycle 20 as shown represents just one possible embodiment of a vehicle 10 in which features described below may be incorporated. For example, although shown as a motorcycle 20 with an open cockpit and no surrounding body, aspects of the invention may be provided in alternate styles of vehicles including different styles of two-wheeled vehicles, on or off-road vehicles having more than two wheels, and vehicles that partially or fully encapsulate the operator.

The powertrain assembly 56 is coupled to the frame 24 beneath the seat 28 and between the front wheel 32 and rear wheel(s) 52 of the motorcycle 20. The engine 60 of the illustrated motorcycle 20 is a gasoline powered V-twin engine 60, but other engine constructions may also be utilized. The engine 60 is coupled to the transmission assembly 64 which is configurable in multiple transmission settings or gear ratios as described in further detail below to drive the rear wheel 52 in different ways. The moving parts of the powertrain assembly 56 are positioned within one or more housings including a transmission housing 72 to protect the powertrain assembly 56 from the environment and to prevent external interference with any rotating parts.

The motorcycle 20, in many instances, is relatively large and heavy and can be difficult to manually maneuver when attempting to park or move the motorcycle 20. Therefore, the powertrain assembly 56 includes both a forward drive system 76 that propels the rear wheel 52 of the motorcycle 20 in a forward direction F and a reverse drive system 80 that propels the rear wheel 52 of the motorcycle 20 in a reverse direction R.

Figure 2:
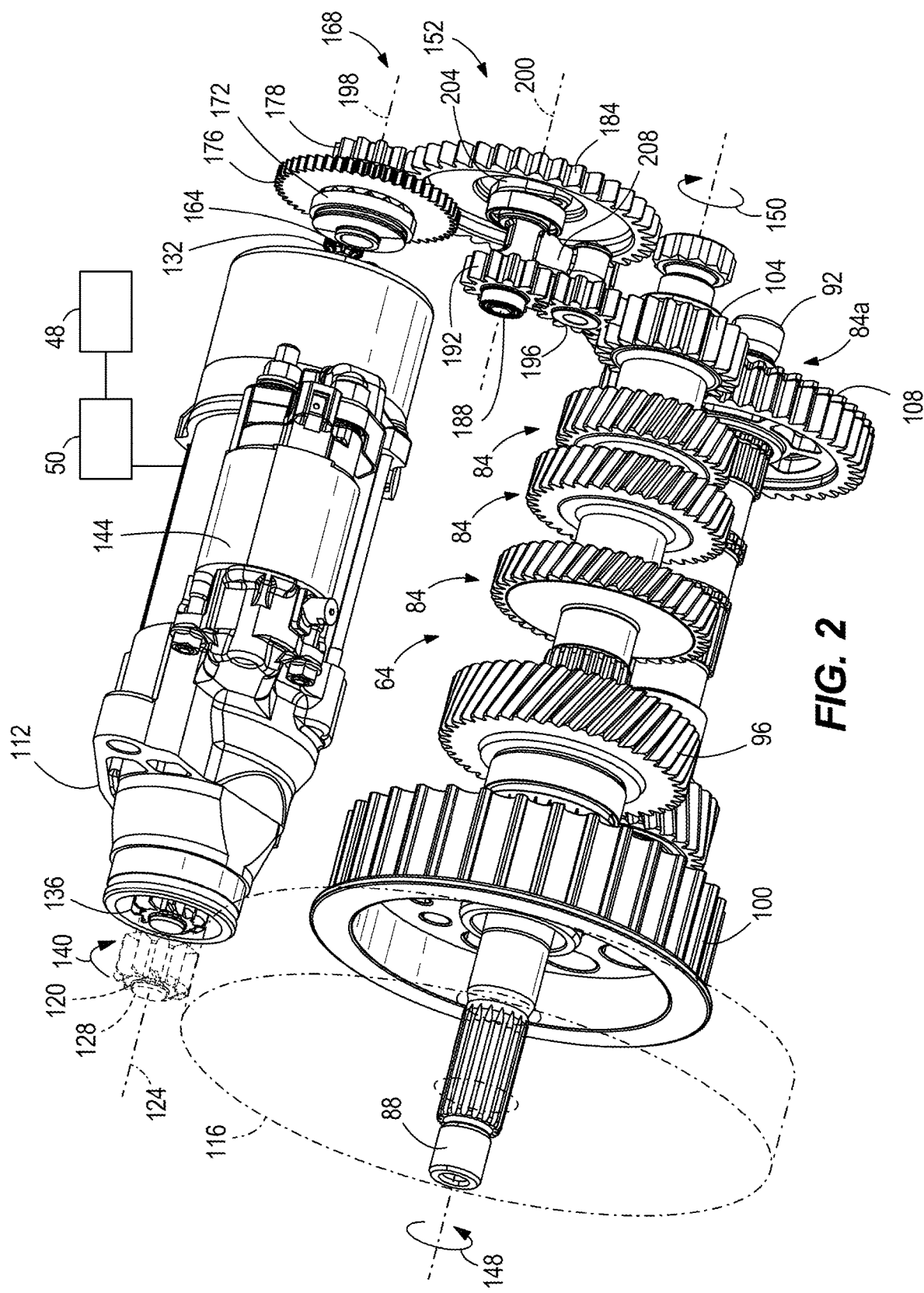
FIG. 2 is a perspective view of a portion of a transmission and a reverse drive assembly of the motorized vehicle of FIG. 1.
Figure 3:
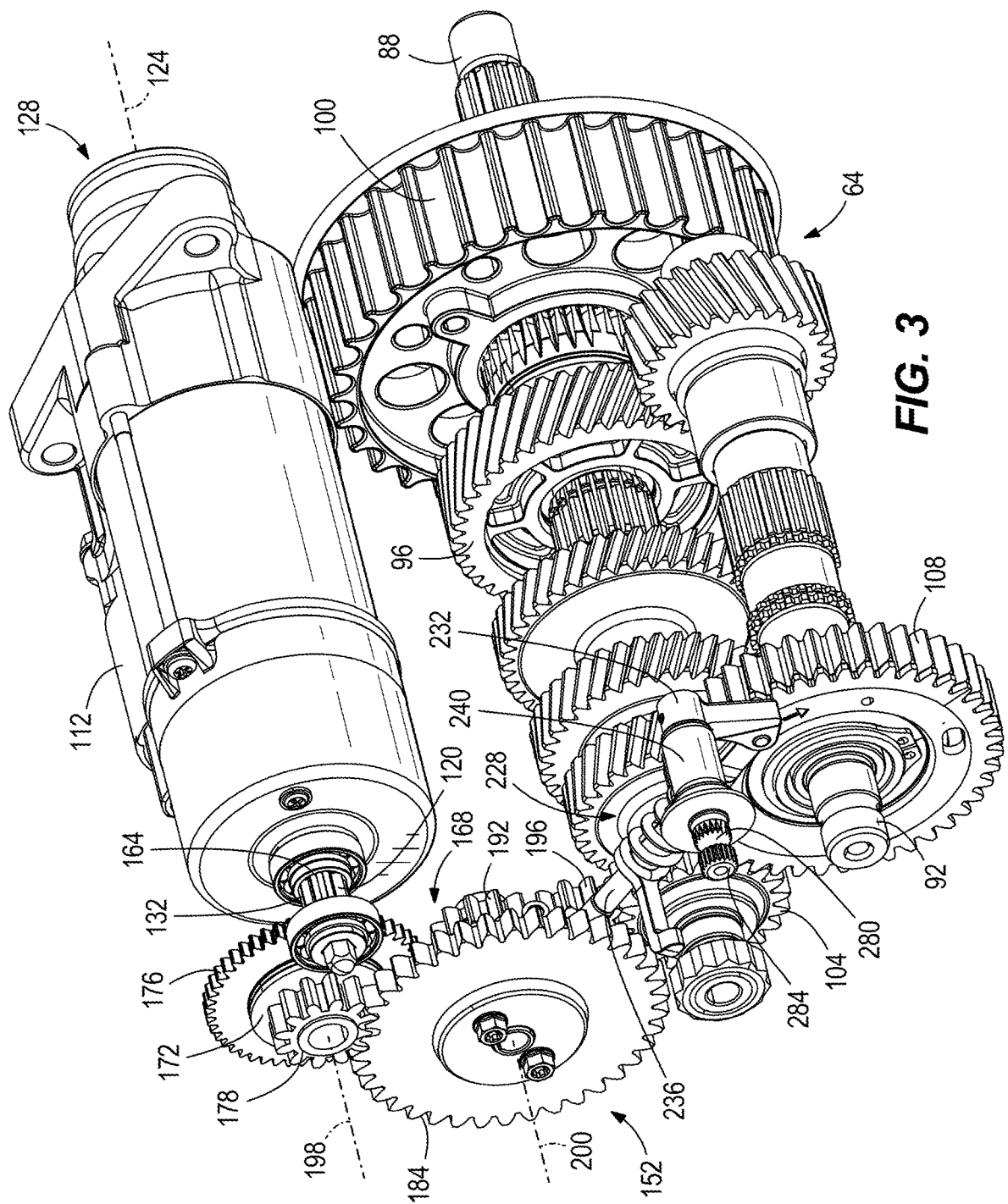
FIG. 3 is another perspective view of the portion of the transmission and reverse drive assembly of FIG. 2.

With reference to FIGS. 2 and 3, the transmission assembly 64, or simply "transmission" 64, is a multi-speed transmission having a plurality of gear pairs 84 located on two parallel transmission shafts, including a main shaft 88 and a counter shaft 92. The main shaft 88 is operably coupled to the engine 60 by a clutch pack (not shown). The clutch pack can be in an open state, in which torque from the engine 60 is not transmitted to the main shaft 88, and in a closed state, in which torque from the engine 60 is transmitted to the main shaft 88. The clutch pack may be controlled by the user interface 48, for example a hand operated clutch lever positioned on or adjacent a left grip of the handlebar 36. The transmission 64 includes a bottle gear 96 positioned coaxially with the main shaft 88 and freely rotatable relative to the main shaft 88. The bottle gear 96 is rotatably driven by the counter shaft 92. An output drive wheel 100 is mounted on the bottle gear 96 and rotates with the bottle gear 96. The output drive wheel 100 is operably connected to the rear wheel 52 to transmit torque to the rear wheel 52. The output drive wheel 100 may be configured as a gear, a pulley, a sprocket, or other device to transmit rotation and torque. In other constructions, the output drive wheel 100 may be positioned on the counter shaft 92 and the bottle gear 96 may be moved or omitted.

The main shaft 88 and the counter shaft 92 and the gear pairs 84 can be connected in different configurations to create the different transmission settings. Each gear pair 84 of the transmission 64 defines a distinct forward gear ratio that can be selectively engaged. For example, a first gear pair 84a includes a main shaft gear 104 and a counter shaft gear 108. The first gear pair 84a is selectively coupled by a shifting assembly (e.g., shifting drum, not shown) to the counter shaft 92 and rotation from the main shaft 88 is transmitted to the counter shaft 92 through the first gear pair 84a. The first gear pair 84a may be associated with a "first gear" forward gear ratio. At most one of the gear pairs 84 is engaged at a time and the unselected gear pairs 84 are freely rotatable relative to the counter shaft 92 and do not transmit torque to the counter shaft 92. When none of the gear pairs 84 are selected the transmission 64 is in a neutral position and no rotation is transmitted to the bottle gear 96. The gear setting or selection of the transmission may be selectable by the rider (e.g., manually or electro-mechanically). For example, the rider opens the clutch pack and then uses a foot operated shifter on the left side of the frame 24 to move the shifting assembly and select one of the gear pairs 84 to change the transmission setting. In other constructions, the transmission setting may be automatically selected by a controller or other automated system and the shift drum may be coupled to an electronic actuator.

With continued reference to FIGS. 2 and 3, the powertrain assembly 56 also includes an electric starter motor 112 selectively coupled to the engine 60 (e.g., to a crankshaft of the engine 60) to rotate the engine 60 during a starting operation. In the illustrated embodiment, the connection between the starter motor 112 and the engine 60 is schematically represented by engine gear 116. The actual connection may include one or more gears and may utilize belts or pulleys to transmit torque. The starter motor 112 includes a motor shaft 120 extending along a motor axis 124 between a first end 128 and a second end 132. The motor shaft 120 is rotatable about the motor axis 124 and a starter pinion 136 is coupled to the motor shaft 120 for rotation therewith. When the starter motor 112 is energized, the motor shaft 120 is driven to rotate about the motor axis 124 in a drive direction 140 (e.g., clockwise when viewed from the left side of the starter motor 112 as seen in FIG. 2). The starter pinion 136 is mounted on the motor shaft 120 for translation along the motor axis 124 between a first position (e.g., a retracted position) and a second position (e.g., an extended position). As seen in FIG. 2, in the extended position, the starter pinion 136 is meshed with the engine gear 116. Rotation of the motor shaft 120 is thereby transmitted to the engine 60 to begin a starting operation of the engine 60. In the retracted position, the starter pinion 136 is spaced from the engine gear 116 and rotation of the motor shaft 120 is not transmitted to the engine 60. The starter pinion 136 is movable between the extended position and the retracted position by an electronic actuator 144 (e.g., a solenoid). In some constructions, the starter pinion 136 may be biased toward the retracted position. The starter motor 112 may be selectively energized by the user interface 48. For example, the user interface may include a button associated with a starting operation. Actuation of the button may cause the control system 50 to send a signal the starter motor 112 to rotate the motor shaft 120 and to send a signal to the electronic actuator 144, moving the starter pinion 136 into engagement with the engine gear 116.

The forward drive system 76 includes the engine 60, the clutch pack, the transmission 64, and the rear wheel 52. A forward power transmission path is defined through the transmission 64 when the forward drive system 76 is engaged. Torque generated by the engine 60 is transmitted to rotate the rear wheel 52 forward and propel the motorcycle 20 in a forward direction F.

The reverse drive system 80 includes the starter motor 112, a reverse drive assembly 152 selectively engageable with the transmission 64, the transmission 64, and the rear wheel 52, so that torque generated by the starter motor 112 is transmitted to rotate the rear wheel 52 in reverse and propel the motorcycle 20 in the reverse direction R. The reverse drive assembly 152 connects between the starter motor 112 and the transmission 64 to establish a reverse power transmission path to the rear wheel 52. The reverse drive system 80 may be a parallel system to the forward drive system 76 so that only one of the reverse power transmission path or the forward power transmission path is established at a time.

As seen in FIGS. 2 and 3, the motor shaft 120 of the starter motor 112 extends between the first end 128 and the second end 132. The first end 128 selectively engages the engine 60 and, as seen best in FIG. 3, the second end 132 of the motor shaft 120 couples to the reverse drive assembly 152. The motor shaft 120 may be a single unitary piece that extends between the first end 128 and the second end 132. In other constructions, the motor shaft 120 may be two separate pieces coaxially mounted in the starter motor 112 for rotation about the motor axis 124. Regardless of construction, both the first end 128 and the second end 132 of the motor shaft 120 are driven to rotate in the same direction 140 about the motor axis 124. As discussed above, the starter motor 112 may be selectively energized by the user interface 48. In some embodiments, the user interface 48 may include an additional button associated with a reverse drive operation. Actuation of the additional button may cause the control system 50 to send a signal to the motor 112 to rotate the motor shaft 120 in the drive direction 140. No signal is sent to the electronic actuator 144 and so the starter motor 112 remains disconnected from the engine 60. In other embodiments, the user interface 48 may take other forms and may only include a single button that, when actuated, sends a signal to the control system 50 which uses stored information and current operating states to determine what signals to send the starter motor 112.

The reverse drive assembly 152 includes an input coupled to the second end 132 of the motor shaft 120 of the starter motor 112, and an output selectively coupled to the main shaft 88 of the transmission 64. The starter motor 112 includes a reverse pinion 164 mounted on the motor shaft 120 for rotation therewith about the motor axis 124 in the drive direction 140 (e.g., clockwise when viewed from the left side of the starter motor 112 in FIG. 2). The reverse pinion 164 is fixed for rotation with the second end 132 of the motor shaft 120. In some constructions, the reverse pinion 164 may be integrally formed in the second end 132 of the motor shaft 120. In other constructions, the reverse pinion 164 may be a separate component that is secured to the motor shaft 120 for corotation therewith.

Figure 4:
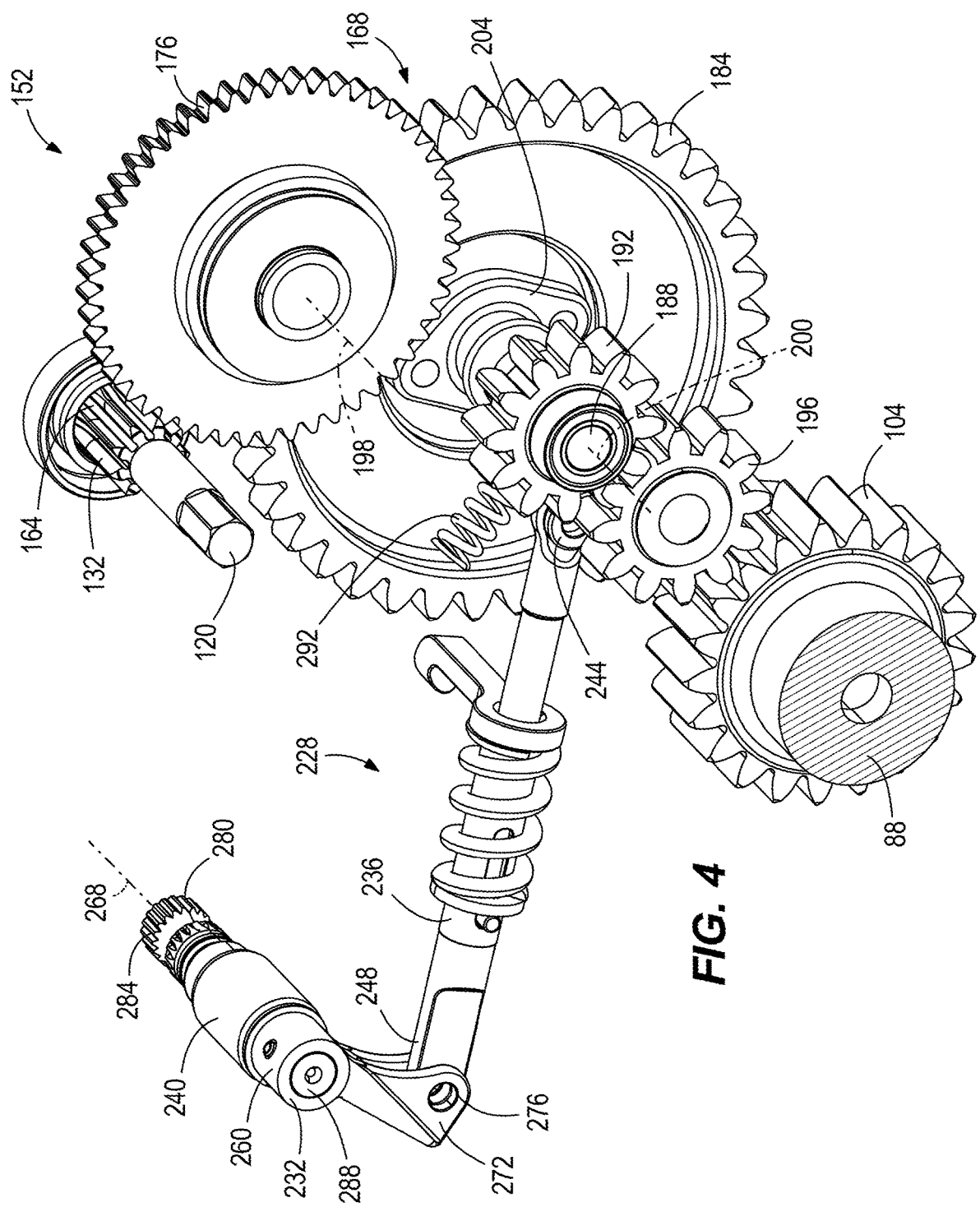
FIG. 4 is a perspective view of the reverse drive assembly of FIG. 2 and a control assembly.
Figure 5:
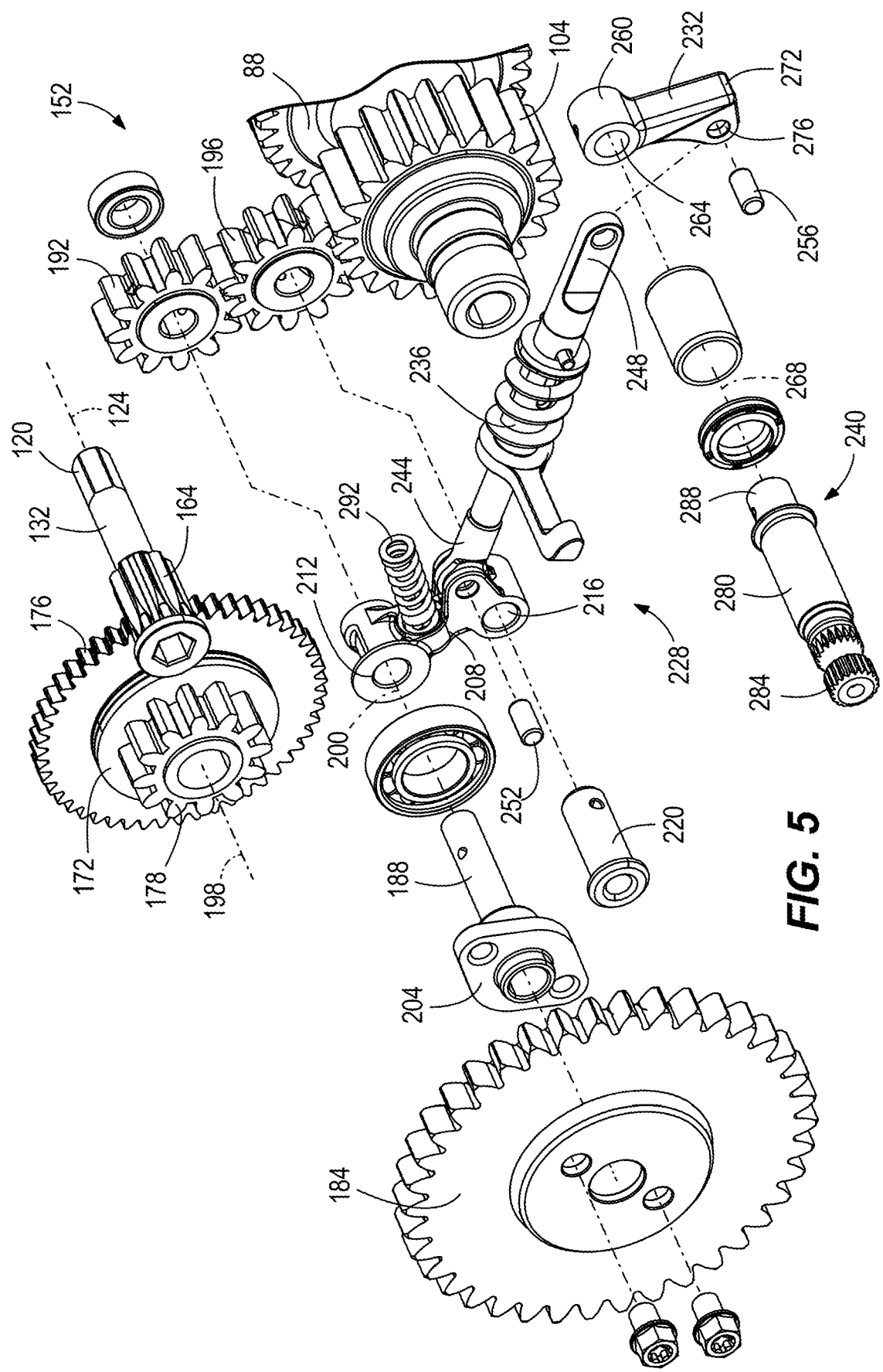
FIG. 5 is an exploded view of the reverse drive assembly and control assembly of FIG. 4.

Turning to FIGS. 3, 4, and 5, the reverse pinion 164 is coupled to a reverse drive gear train 168. The illustrated reverse drive gear train 168 includes an input gear 176 and a slip gear 178 coupled by a torque limiter 172. The reverse drive gear train 168 also includes a reverse gear 184, a pivot shaft 188, an intermediate gear 192, and an output gear 196. In other constructions, the reverse drive gear train 168 may include a different amount or configuration of gearing components based on a desired magnitude of torque multiplication (e.g., gear ratio) between the starter motor 112 and the transmission 64. The input gear 176 and slip gear 178 are supported in the transmission housing 72 for rotation about a torque axis 198, spaced from and parallel to the motor axis 124. The input gear 176 is meshed with the reverse pinion 164 on the second end 132 of the motor shaft 120. Unlike the starter pinion 136 on the first end 128 of the motor shaft 120, the second end 132 does not include any actuators for selectively engaging the reverse drive assembly 152. Instead, the reverse pinion 164 on the second end 132 of the motor shaft 120 is in constant mesh with the reverse drive gear train 168. As best seen in FIG. 3, the slip gear 178 is meshed with the reverse gear 184. The slip gear 178 is smaller than the input gear 176 (e.g., the slip gear 178 has fewer teeth than the input gear 176). The slip gear 178 is coupled to the input gear 176 by the torque limiter 172. The torque limiter 172 may include a set of clutch plates or other mechanism that selectively couples the input gear 176 and the slip gear 178 for co-rotation when the transmitted torque is below a certain torque value. Above the set torque value, the torque limiter 172 allows the slip gear 178 to rotate with respect to the input gear 176, to prevent back driving of the starter motor 112 or other damage to the reverse drive assembly 152.

With reference to FIG. 5, the pivot shaft 188 is supported in the transmission housing 72 for rotation about a pivot axis 200 (FIG. 3). The reverse gear 184 is secured to the pivot shaft 188 for rotation therewith via a bracket 204. The intermediate gear 192 is mounted on the pivot shaft 188 opposite the bracket 204. Thus, rotation of the reverse gear 184 about the pivot axis 200 is transmitted to the intermediate gear 192 through the pivot shaft 188. The intermediate gear 192 is in constant mesh with the output gear 196 (also referred to herein as swivel gear 196). The output gear 196 forms the output of the reverse drive assembly 152 and is selectively engaged with the transmission 64. More specifically, the output gear 196 is selectively engaged with the main shaft gear 104 of the first gear pair 84a on the main shaft 88, associated with the "first gear" transmission setting.

With continued reference to FIG. 5, the reverse drive assembly 152 includes a pivot carrier 208. The pivot carrier 208 includes a first opening 212 and a second opening 216. The first opening 212 receives the pivot shaft 188 so that the pivot carrier 208 is positioned between the bracket 204 and the intermediate gear 192. The pivot carrier 208 is therefore rotatable about the pivot axis 200. The second opening 216 receives a swivel shaft 220 that supports the output gear 196 for rotation with respect to the pivot carrier 208. The second opening 216 is offset from the first opening 212 so that rotation of the pivot carrier 208 about the pivot axis 200 moves the second opening 216 and the output gear 196 relative to the transmission 64, or in other words the output gear 196 is carried by the pivot carrier 208 about the pivot axis 200. During movement of the pivot carrier 208, the intermediate gear 192 and the output gear 196 remain in constant mesh and rotation is transmitted from the intermediate gear 192 to the output gear 196 regardless of the position of the pivot carrier 208.

As illustrated in FIGS. 4 and 5, the pivot carrier 208 is movable by a control assembly 228 including a control arm 232, a control rod 236 coupled between the control arm 232 and the pivot carrier 208, and an actuator 240. The control rod 236 extends between a first end 244 and a second end 248. The first end 244 is coupled to the pivot carrier 208 by a first pin 252. The second end 248 is coupled to the control arm 232 by a second pin 256. The control arm 232 includes a hub portion 260 with a opening 264 extending along a control axis 268. The control arm 232 also includes an extended portion 272 having a slot 276 for receiving the second pin 256. The actuator 240 includes an actuator shaft 280 that extends along the control axis 268 between a first end 284 and a second end 288 that is received in the opening 264 of the control arm 232. Thus, the control arm 232 is rotatable with the shaft 280 about the control axis 268. Rotation of the control arm 232 moves the slot 276, and thus the second end 248 of the control rod 236, eccentrically about the control axis 268. The control rod 236 is therefore translated within the transmission housing 72 to rotate the pivot carrier 208 about the pivot axis 200.

Figure 6A:
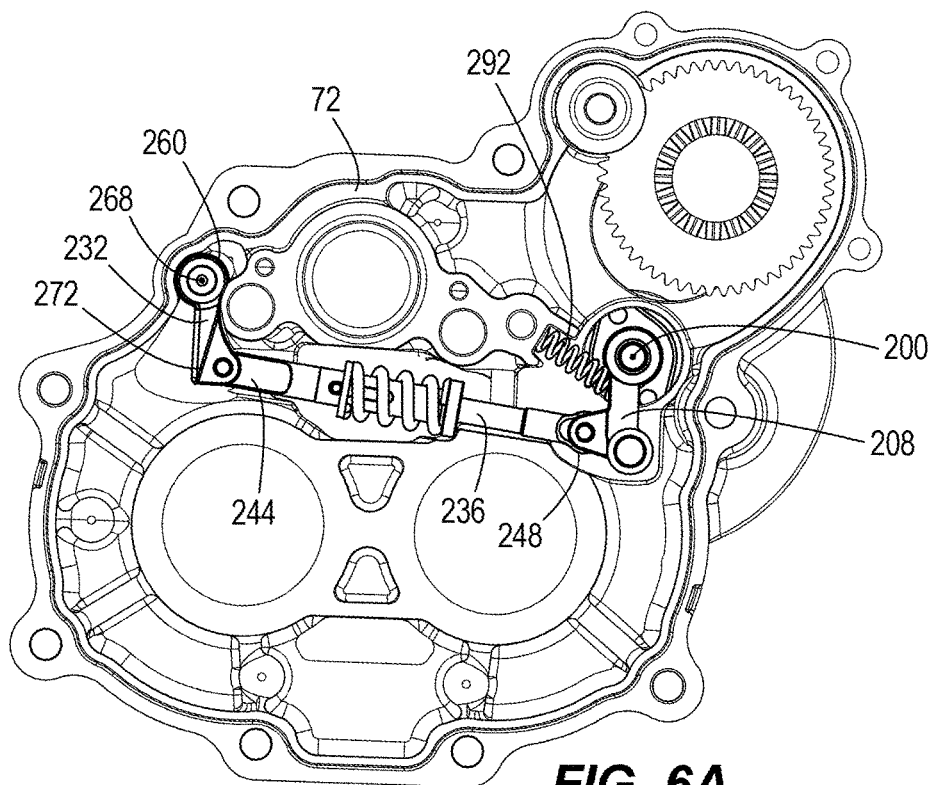
FIG. 6A is a side view of the control assembly of FIG. 4 within a housing of the transmission in a first configuration.
Figure 6B:
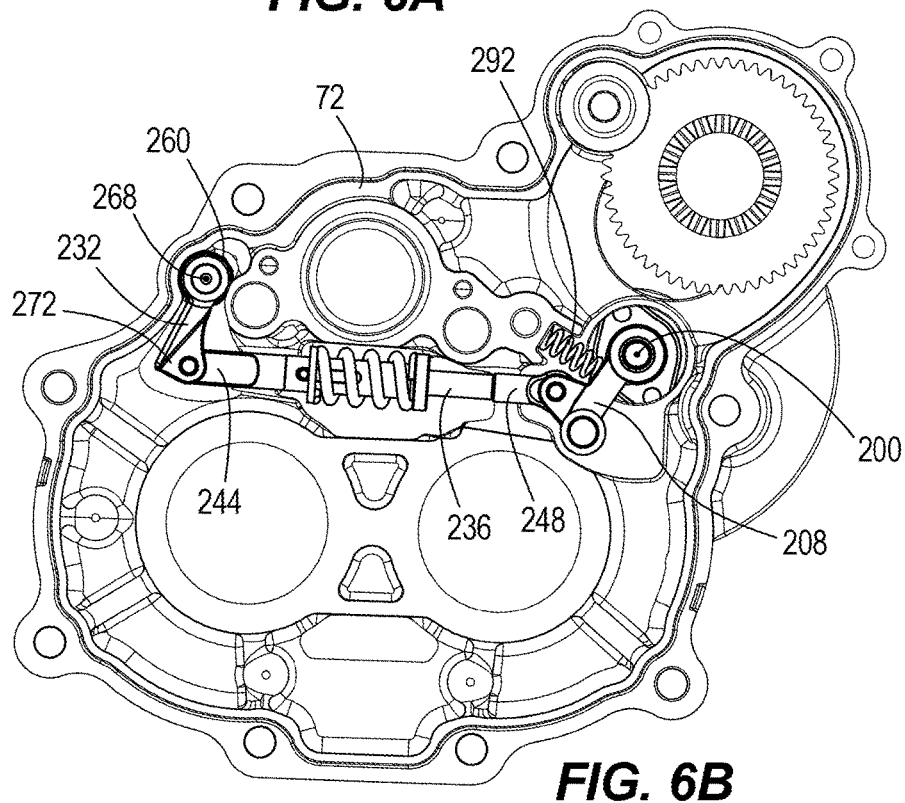
FIG. 6B is a side view of the control assembly of FIG. 4 within the housing of the transmission in a second configuration.

Turning to FIGS. 6A and 6B, the pivot carrier 208 is movable by the control assembly 228 between a first position, or disengaged position (FIG. 6A), and a second position, or engaged position (FIG. 6B). Thus, the reverse drive assembly 152 is movable between a first configuration (or disengaged configuration) in which the output of the reverse drive assembly 152 is spaced from the main shaft 88 and a second configuration (or engaged configuration) in which the output of the reverse drive assembly 152 is engaged with the main shaft 88. The pivot carrier 208 may include a biasing element 292 that engages a portion of the transmission housing 72 to bias the pivot carrier 208 to the disengaged position. In the illustrated configuration, the control arm 232 is positioned on the opposite side of the main shaft gear 104 than the output gear 196 of the reverse drive assembly 152, and the control assembly 228 "pulls" the output gear 196 into engagement with the main shaft gear 104. In other constructions the output gear 196 may be positioned on the same side of the main shaft gear 104 as the control assembly 228 and the control assembly 228 may "push" the output gear 196 into engagement with the main shaft gear 104.

Referring again to FIG. 1, the powertrain assembly 56 described herein includes the two parallel power transmission pathways beginning with the forward and reverse drive systems 76, 80, respectively.

A rider may initiate a starting operation of the motorcycle 20 using the user interface 48, for example by pressing a button associated with starting the engine 60. In response, the control system 50 sends a signal to the electronic actuator 144 and the electronic actuator moves the starter pinion 136 from the retracted position to the extended position, to engage the engine gear 116. The control system 50 energizes the starter motor 112 to rotate the motor shaft 120 in the drive direction 140 and therefore transmit rotation to the engine 60. Once the engine 60 has started, the starter motor 112 can be de-energized and ceases rotation. The electronic actuator 144 returns the starter pinion 136 to the retracted position. During the starting operation, the reverse drive assembly 152 is in constant mesh with the second end 132 of the starter motor 112 and rotates along with the components driven by the first end 128 of the starter motor 112.

With reference to FIG. 3, the forward path begins with the engine 60 which generates torque to propel the motorcycle 20 in the forward direction F. When the clutch pack is engaged the torque from the engine 60 is transmitted to the main shaft 88 of the transmission 64, rotating the main shaft 88 in a forward direction (represented by arrow 148). A transmission setting of forward gear ratio is selected by the operator. The torque is then transmitted through the selected gear pair 84, through the counter shaft 92, to the output drive wheel 100 of the transmission 64, and to the rear wheel 52 to rotate the rear wheel 52 in a forward direction.

With reference to FIGS. 3 and 4, the reverse path begins at the starter motor 112 which generates torque to propel the motorcycle 20 in the reverse direction R. The reverse drive assembly 152 is put in the engaged configuration with the pivot carrier 208 moved to the engaged position by the control assembly 228 so that the output gear 196 is meshed with the main shaft gear 104 to transmit the torque from the starter motor 112 to the rear wheel 52. Specifically, the control assembly 228 is operated by rotating the actuator shaft 280 about the control axis 268, thereby moving the control rod 236 and pulling the pivot carrier 208 so the output gear 196 is meshed with the main shaft gear 104 of the main shaft 88. In some constructions, the actuator 240 is rotated by mechanical or electro-mechanical components.

Once the reverse drive assembly 152 is engaged, a rider begins a reverse operation of the motorcycle 20 using the interface 48 (for example by pressing one or more buttons). The control system 50 signals the electronic actuator 144 to keep (or place) the starter pinion 136 in the retracted position. The control system 50 also energizes the starter motor 112 to rotate the motor shaft 120 in the drive direction 140. The second end 132 of the motor shaft 120 is in constant mesh with the reverse drive assembly 152, and therefore torque from the starter motor 112 is transmitted through the reverse pinion 164 on the second end 132 of the motor shaft 120, and to the gears 176, 178 184, 192, 196 of the reverse drive gear train 168. The reverse drive assembly 152 transmits the torque to the main shaft 88 of the transmission 64 through the engaged output gear 196. Thus, the main shaft 88 is rotated in a reverse direction (represented by arrow 150), opposite the forward direction 148. The "first gear" transmission setting is selected so that the first gear pair 84a, including the main shaft gear 104 and the counter shaft gear 108 are locked for rotation with the counter shaft 92. Torque is therefore transmitted from the output gear 196, through the main shaft gear 104, the counter shaft gear 108, and to the counter shaft 92. The bottle gear 96 is meshed with the counter shaft 92 (e.g., a driver gear at the end of the counter shaft 92) to rotate there with. Torque is transmitted from the counter shaft 92 to the bottle gear 96. The output drive wheel 100 is mounted on the bottle gear 96 and fixed for rotation with the bottle gear 96. Torque is transmitted through the bottle gear 96 to the output drive wheel 100 and the output drive wheel 100 drives the rear wheel 52 in reverse.

The forward drive system 76 and the reverse drive system 80 are prevented from operating simultaneously so as not to damage the motorcycle 20. To operate the forward drive system 76, the reverse drive assembly 152 is disengaged by a lever assembly (e.g., 300, 400, described in more detail below) so that the output gear 196 is spaced from the main shaft gear 104 and the reverse transmission path is broken. In this configuration, any rotation of the starter motor 112 is not transmitted to the main shaft 88 even though the reverse drive assembly 152 is connected to the motor shaft 120 and rotates therewith. In other words, the reverse assembly 152 does not disengage from the starter motor 112 during operation of the forward drive system 76. Instead, the reverse drive assembly 152 disengages from the transmission 64. Thus, the forward drive system 76 is operable without inadvertently transmitting torque to the reverse drive system 80 which could damage the reverse drive system 80.

To operate the reverse drive system 80, the clutch pack is opened, breaking the forward drive path, and the transmission 64 is placed into a "first gear" transmission setting with the main shaft gear 104 and the counter shaft gear 108 coupled to the counter shaft 92. The control assembly 228 is in the engaged position to operably couple the reverse drive assembly 152 to the main shaft 88 of the transmission 64. In some embodiments, a mechanical or electronic clutch lock may be used in place of or alongside a manual clutch control to maintain the clutch pack in the open state during operation of the reverse drive system 80. While the clutch remains open, the transmission 64 is isolated from the engine 60 and the reverse drive system 80 is operable to transmit torque to the rear wheel 52 without inadvertently transmitting torque to the engine 60 which could damage the engine 60 or the reverse drive system 80.

With reference to FIGS. 7-10C, embodiments of a lever assembly 300, 400 are shown. The lever assembly 300, 400 is used to move the reverse drive assembly 152 between the engaged configuration and disengaged configuration and are operably coupled to the control system 228.

Figure 7:
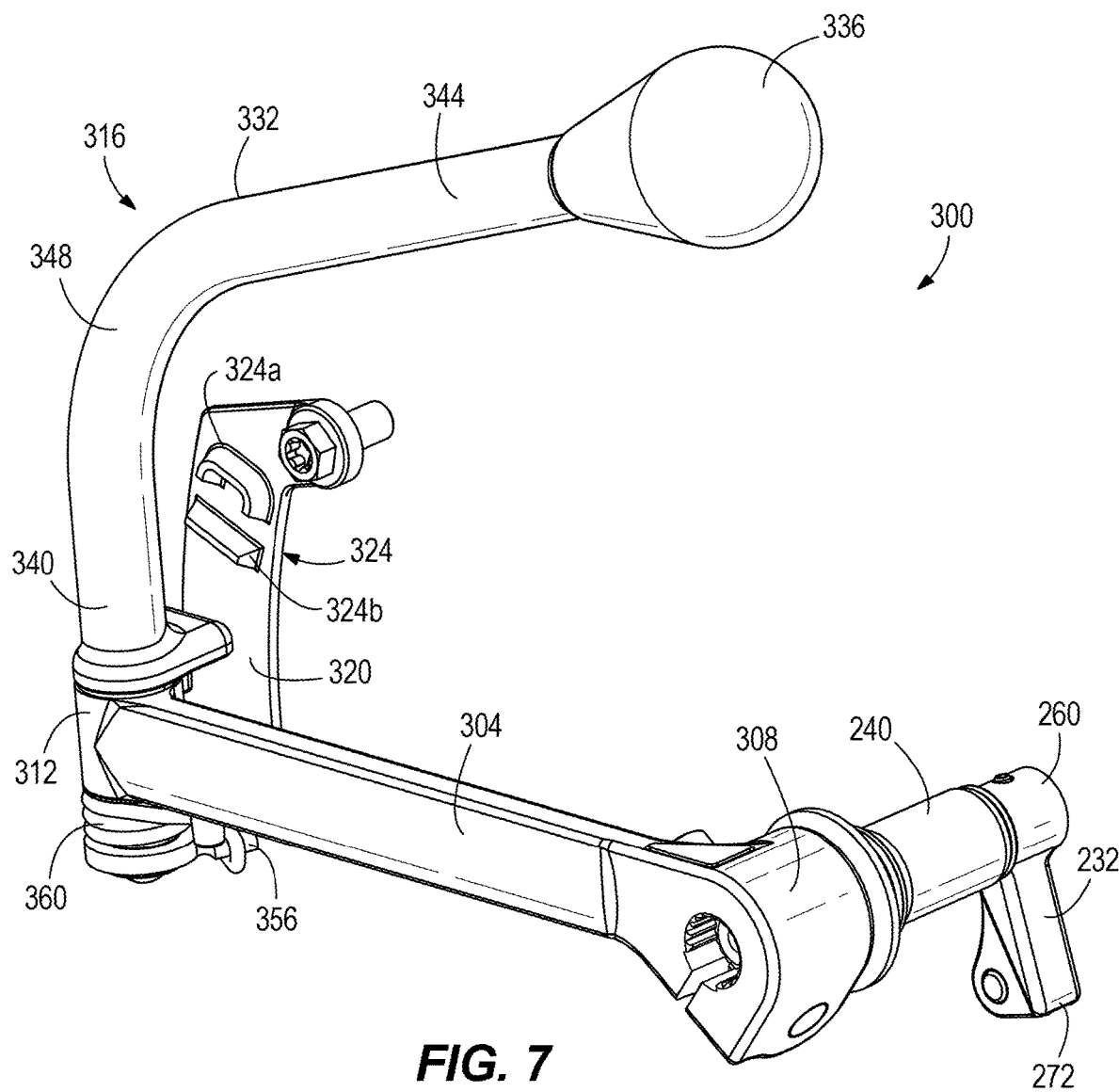
FIG. 7 is a perspective view of a first embodiment of a lever assembly for use with the control assembly of FIG. 4.
Figure 8D:
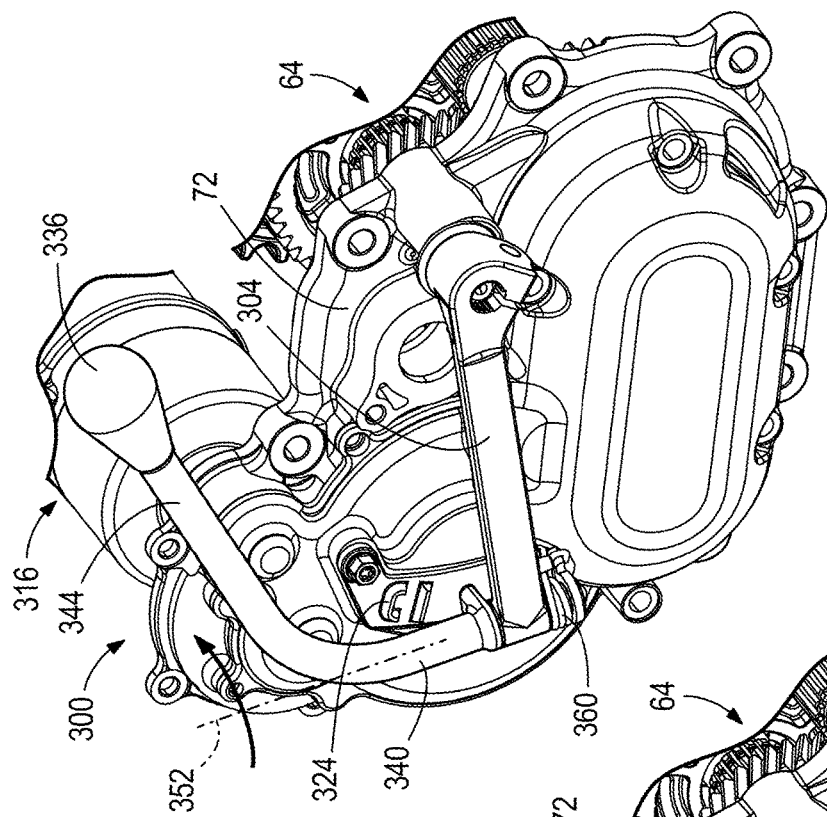
FIG. 8D illustrates the lever assembly of FIG. 7 in a fourth stage of operation, with the handle assembly moved to the locked position, securing the lever arm in the lower position.
Figure 8C:
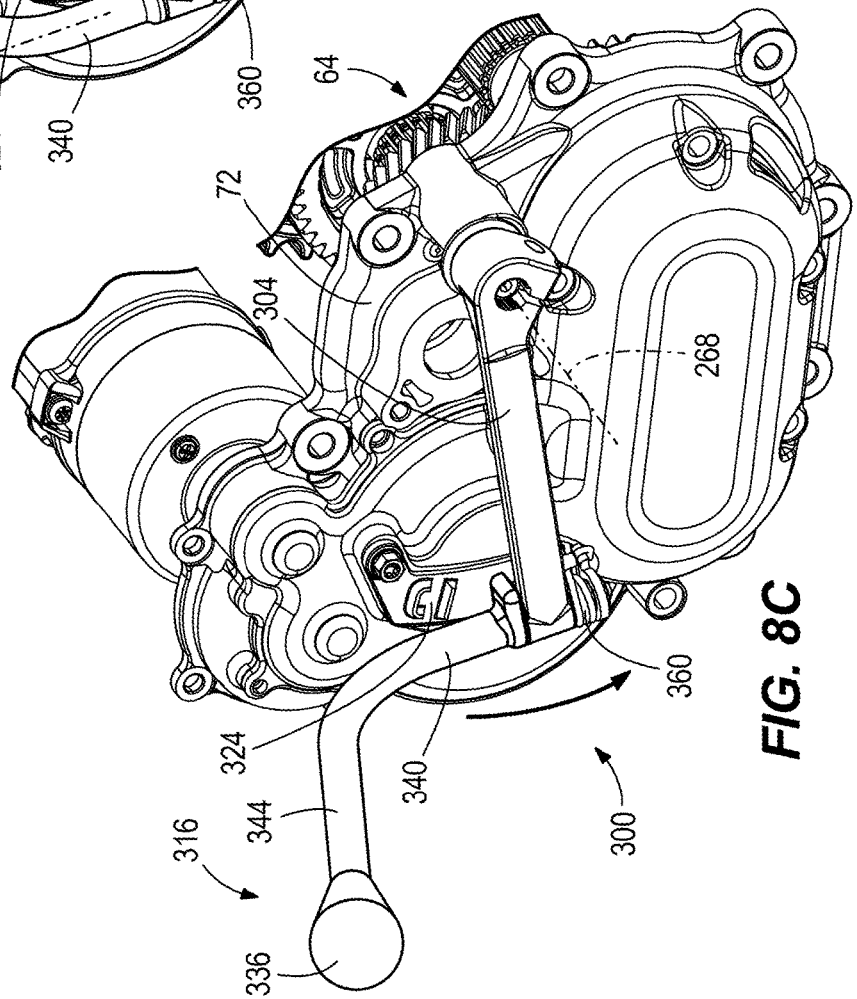
FIG. 8C illustrates the lever assembly of FIG. 7 in a third stage of operation, with the lever arm moved to a lower position.
Figure 8E:
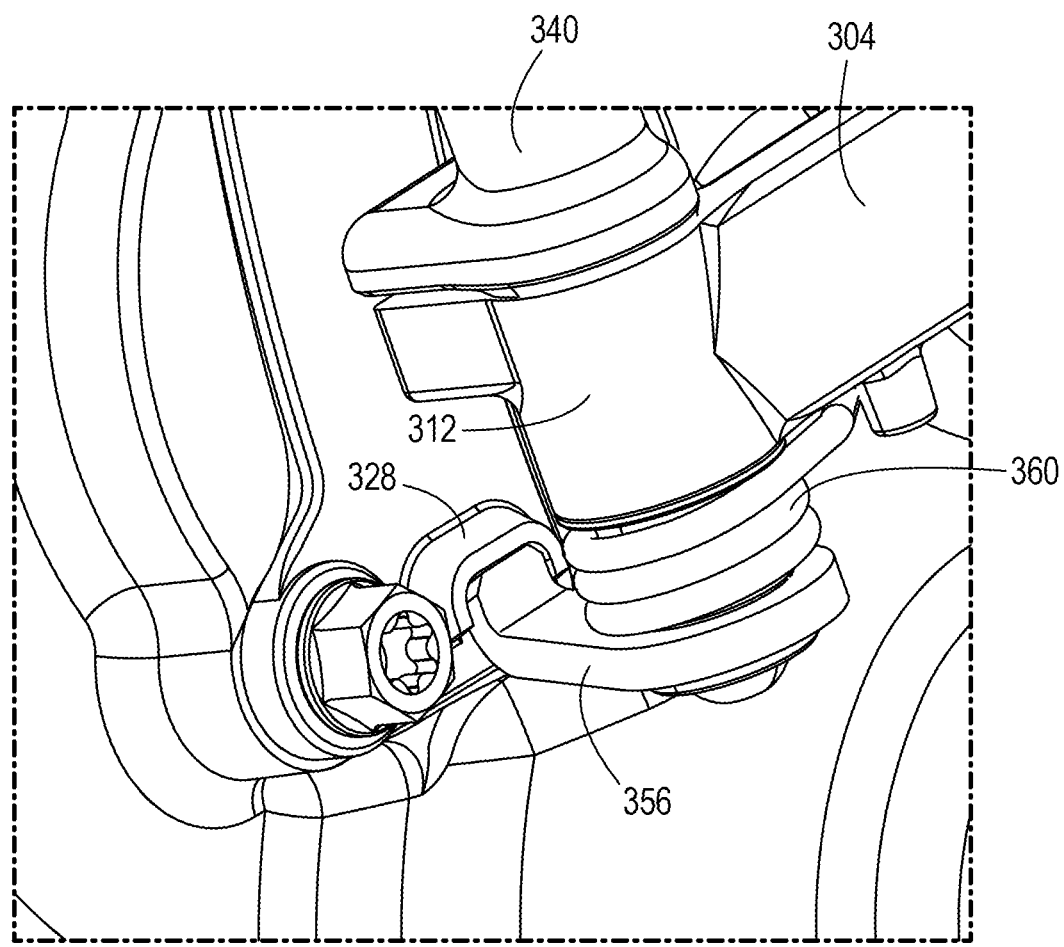
FIG. 8E is a detailed view of a latch of the lever assembly of FIG. 8D.

FIGS. 7-8E illustrate a first embodiment of a lever assembly 300. As discussed above, the actuator 240 of the control assembly 228 may be driven by the lever assembly 300, which is positioned outside the transmission housing 72. The actuator shaft 280 may extend through an opening in the housing 72 so that the first end 284 of the actuator shaft 280 is positioned outside the transmission housing 72 and the second end 288 of the actuator shaft 280 is coupled to the control arm 232 inside the transmission housing 72. With reference to FIG. 7, the lever assembly 300 includes a lever arm 304 extending between a first end 308, coupled to the first end 284 of the actuator shaft 280, and a second end 312 coupled to a handle assembly 316. The lever arm 304 is rotatable with the shaft 280 about the control axis 268 between an upper position (FIG. 8A) and a lower position (FIG. 7). The lever arm 304 may be slightly biased upward by the biasing member 292 acting to move the pivot carrier 208 to the disengaged position. In some constructions, an additional biasing member acts directly on the lever arm 304 to increase the upward bias acting on the lever arm 304.

A latching plate 320 is coupled to the outside of the transmission housing 72 and includes an upper latching feature 324 and a lower latching feature 328. The upper latching feature 324 may include a u-shaped first protrusion 324*a* and a bar shaped second protrusion 324*b*. The lower latching feature 328 includes a u-shaped first protrusion. The latching features 324, 328 shown are merely one exemplary embodiment, other latching features may be used in other constructions.

The handle assembly 316 includes a curved bar 332 and a knob 336 coupled to an end of the curved bar 332. The knob 336 is graspable by a rider (FIG. 1) in order to move the handle assembly 316 between a locked position (FIG. 8A) and an unlocked position (FIG. 8B). The curved bar 332 includes an upright portion 340 and a lateral portion 344 connected by a curved portion 348. The upright portion 340 is coupled to the second end 312 of the lever arm 304 for rotation about a locking axis 352 (FIG. 8B). As best seen in FIG. 8E, a latch member 356 (or simply latch 356) is coupled to the upright portion 340 below the second end 312 of the lever arm 304 and is rotatable with the handle assembly 316 about the locking axis 352. The latch member 356 is selectively engageable with the upper latching feature 324 and lower latching feature 328 to lock the lever arm 304 with respect to the transmission housing 72. The latch member 356 (and therefore the handle assembly 316) may be biased toward the locked position by a biasing member 360 (e.g., a torsional spring).

As seen in FIGS. 8A-8E, the lever assembly 300 can be moved between the upper (first) position and the lower (second) position. With reference to FIG. 8A, the handle assembly 316 is initially positioned in the locked position. In the locked position, the lateral portion 344 extends generally alongside the motorcycle 20, generally parallel to the lever arm 304. The latch 356 engages the upper latching features 324. The first protrusion 324*a* prevents the handle assembly 316 from accidental movement to the unlocked position. The second protrusion 324*b* prevents the lever arm 304 from accidentally being moved to the lower position. Thus the lever arm 304 is secured with respect to the housing 72.

As seen in FIG. 8B, the handle assembly 316 is rotated about the locking axis 352 so that the latch member 356 disengages the upper latching feature 324. The handle assembly 316 is rotated to the unlocked position, in which the lateral portion 344 and the knob 336 extend out from the motorcycle 20, and transverse to the lever arm 304. The lever arm 304 is thus unsecured from the transmission housing 72 and is free to move downward as seen in FIG. 8C to the lower position. The lever arm 304 pivots about the control axis 268 and drives the actuator shaft 280 to move the control assembly 228 and, by extension, the pivot carrier 208. The handle assembly 316 is then rotated about the locking axis 352 back to the locked position. As seen in FIG. 8E, the latch member 356 engages the lower latching feature 328 to secure the lever arm 304 with respect to the transmission housing 72 in the lower position.

In the illustrated configuration, when the lever arm 304 is positioned in the upper position, the reverse drive assembly 152 is not engaged with the transmission 64. When the lever arm 304 is positioned in the lower position, the reverse drive assembly 152 is engaged with the transmission 64. In other constructions, the relationship between the position of the lever arm 304 and the position of the pivot carrier 208 may be reversed or otherwise different.

Figure 9:
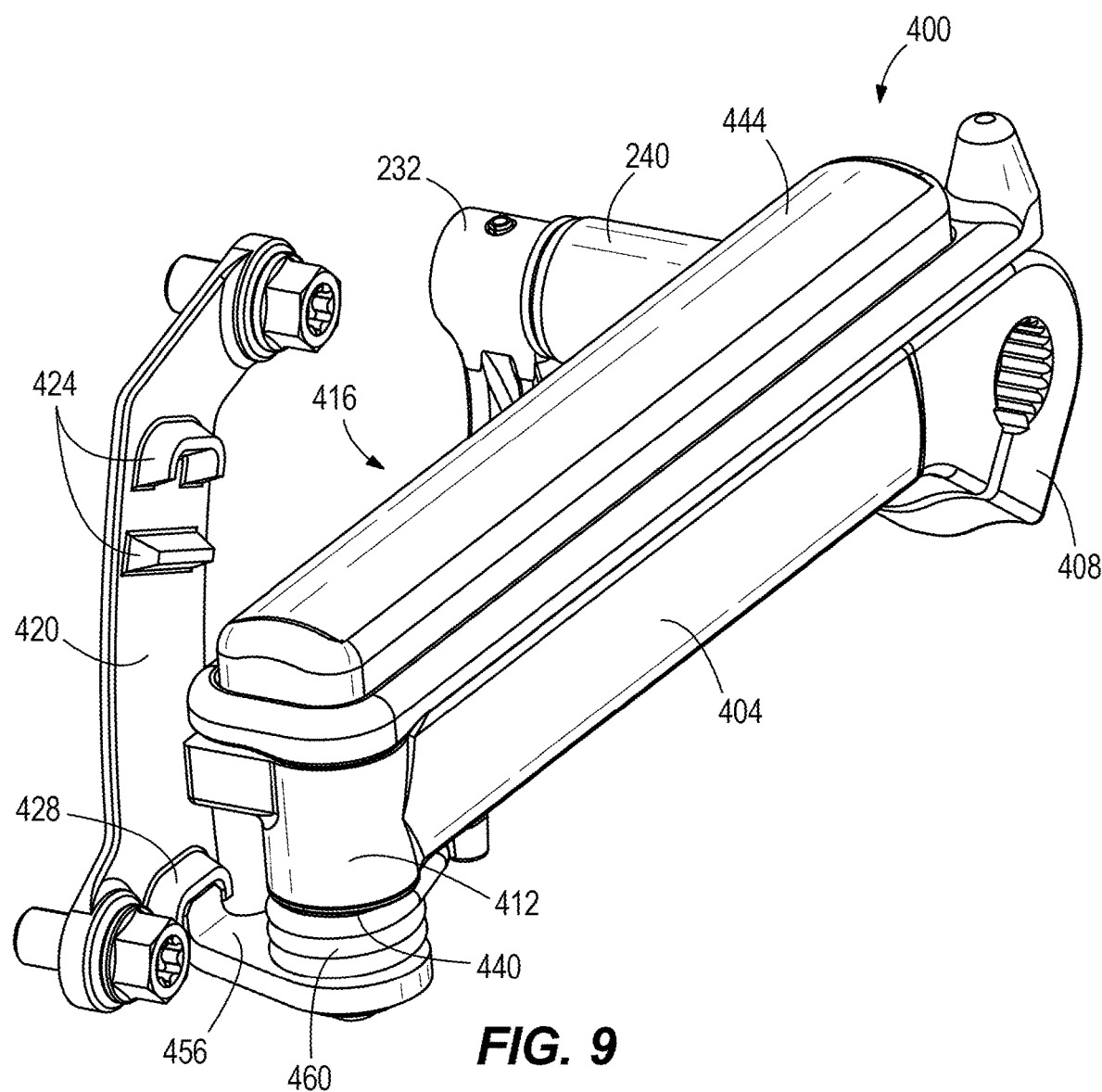
FIG. 9 is a perspective view of a second embodiment of a lever assembly for use with the control assembly of FIG. 4.
Figure 10A:
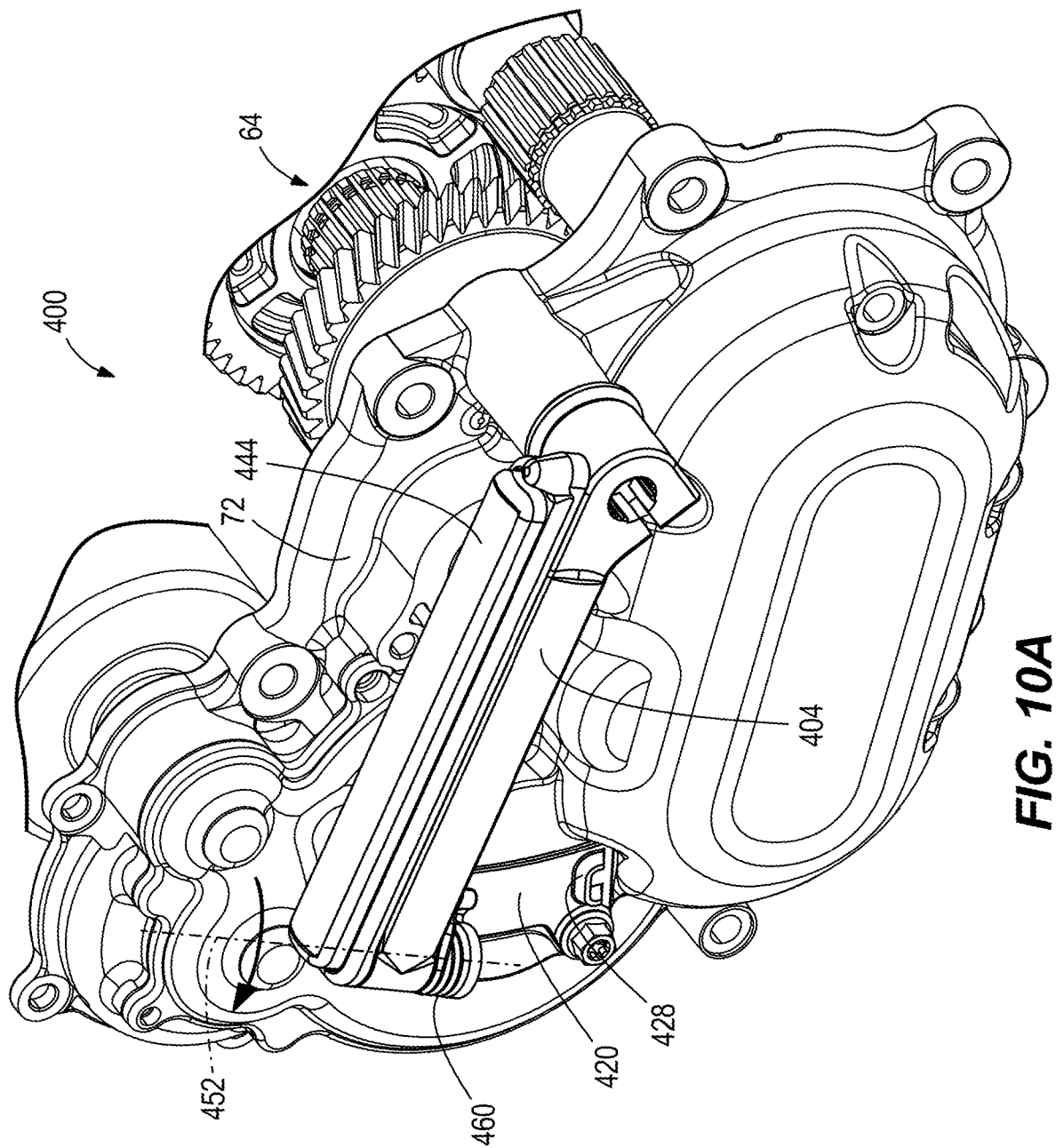
FIG. 10A illustrates the lever assembly of FIG. 9 in a first stage of operation, with a lever arm locked in an upper position by a peg assembly in a locked position.
Figure 10B:
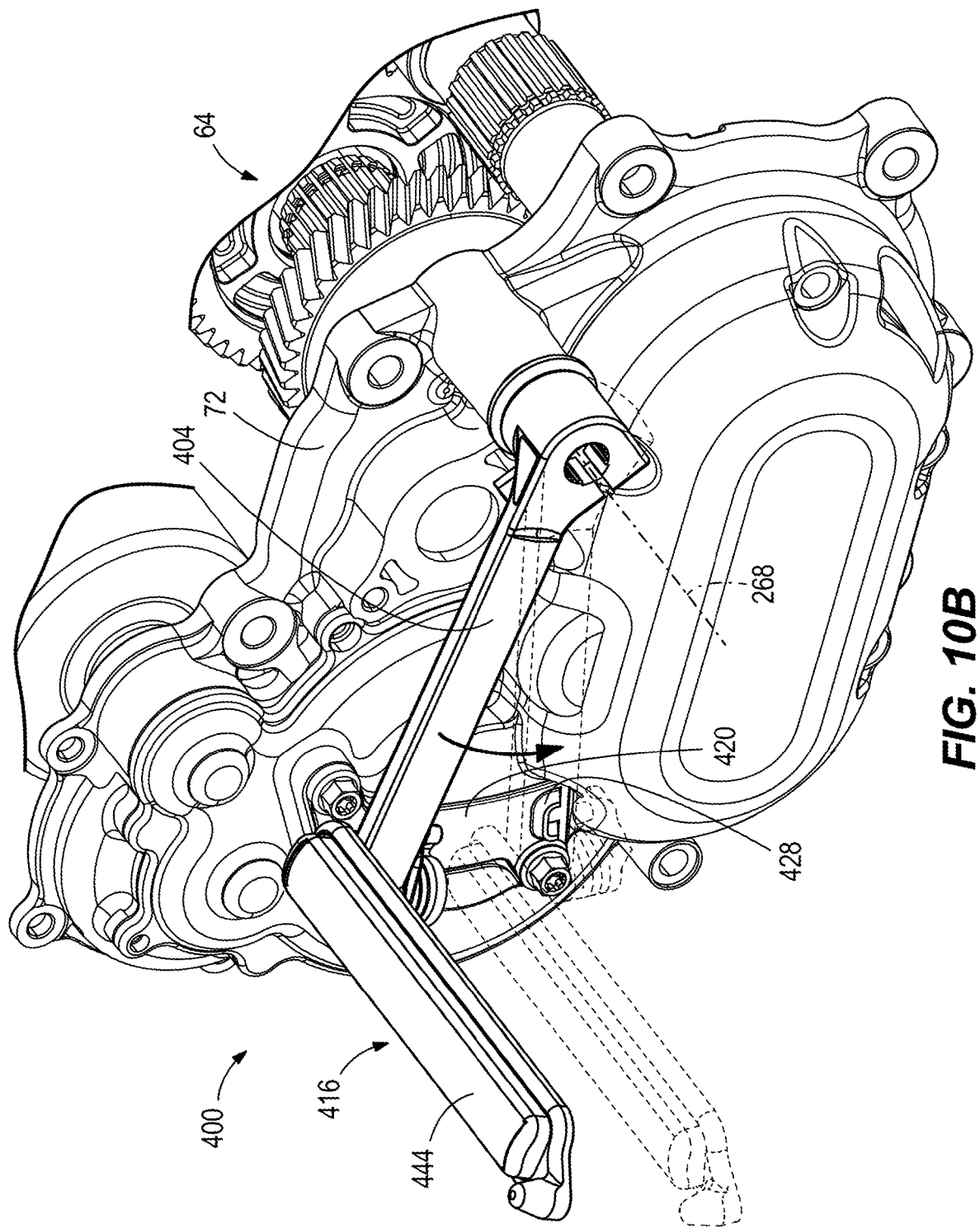
FIG. 10B illustrates the lever assembly of FIG. 9 in a second stage of operation, with the peg assembly moved to an unlocked position, and illustrates in phantom lines the lever assembly of FIG. 9 in a third stage of operation, with the lever arm moved to a lower position.
Figure 10C:
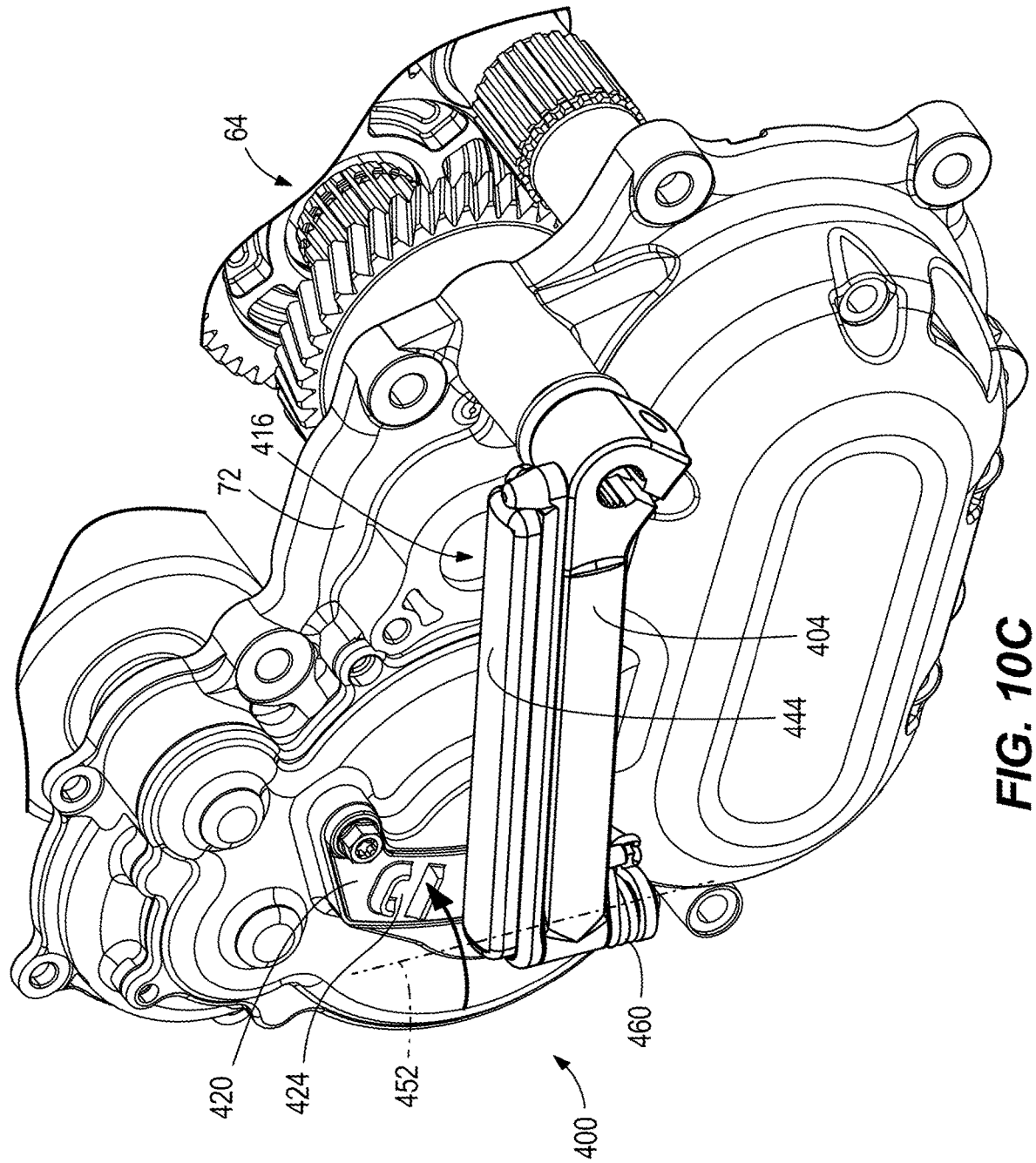
FIG. 10C illustrates the lever assembly of FIG. 9 in a fourth stage of operation, with the peg assembly moved to the locked position, securing the lever in the lower position.

FIGS. 9-10C illustrate an alternative embodiment of a lever assembly 400. The lever assembly 400 similarly includes a lever arm 404 with a first end 408 coupled to the actuator shaft 280 and a second end 412. The lever arm 404 is movable between an upper position (FIG. 10A) a lower position (FIG. 9). A latch plate 420 is coupled to the transmission housing 72 and includes an upper latching feature 424 and a lower latching feature 428, similar to the latching features 324, 328 of the lever assembly 300.

The second end 412 of the lever arm 404 is coupled to a peg assembly 416. The peg assembly 416 operates similarly to the handle assembly 316. The peg assembly 416 includes a peg arm 444 and a shaft 440. The shaft 440 extends along a locking axis 452 through the second end 412 of the lever arm 404 and is coupled to a latch member 456. The peg arm 444 is engageable by an operator's foot to rotate between a locked position and an unlocked position. Rotation of the peg arm 444 rotates the latch member 456. In the locked position the latch member 456 engages the latching features of the latch plate 420 and the peg arm 444 extends along the lever arm 404. In the unlocked position the latch member 456 is rotated away from the latch plate 420 and the peg arm 444 extends out from the lever arm 404. The latch member 456 may be biased toward the locked position by a biasing member 460 (e.g., a torsional spring).

As seen in FIGS. 10A-10C, the lever arm 404 is movable between the upper position, corresponding with the disengaged position of the pivot carrier 208, and the lower position, corresponding with the engaged position of the pivot carrier 208. With reference to FIG. 10A, starts in the locked position in which the latch member 456 engaged with the upper latching feature 424 and the lever arm 404 is secured with respect to the transmission housing 72. The peg arm 444 is rotated about the locking axis 452 away from the locked position. In the unlocked position, shown in FIG. 10B, the lever arm 404 is unsecured with respect to the transmission housing 72 and is free to rotate about the control axis 268 to the lower position. The rotation of the lever arm 404 is transmitted through the control assembly 228 to the pivot carrier 208. Finally, as seen in FIG. 10C, the peg arm 444 is rotated about the locking axis 452 back to the locked position to secure the lever arm 404 in the lower position by engaging the latch member 456 with the lower latching feature 428 of the latch plate 420. As with the lever assembly 400 of FIG. 7, the relationship between the position of the lever arm 404 and the position of the pivot carrier 208 can be reversed.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, one having ordinary skill in the art will appreciate that specific features of the numerous embodiments disclosed may be mixed and matched in other ways where not specifically inhibited, even though specific illustration of such embodiments may not be exhaustively covered herein.

Various features and advantages of the disclosure are set forth in the following claims.

What is claimed is:

1. A motorized vehicle comprising:
    an engine;
    a starter motor having a motor shaft, the motor shaft selectively coupled to the engine to start the engine;
    a transmission main shaft assembly including a main shaft gear provided on a main shaft and rotatable therewith;
    a transmission counter shaft assembly including a plurality of gears supported on a counter shaft, wherein the transmission counter shaft assembly couples to the transmission main shaft assembly in multiple configurations to create multiple forward gear ratios;
    an output drive wheel supported on the main shaft and drivable by the counter shaft, wherein a forward power transmission path is established from the main shaft through the counter shaft to the output drive wheel; and
    a reverse drive assembly including:
        a reverse drive gear train in constant mesh with the motor shaft of the starter motor, the reverse drive gear train including an output gear, and
        a pivot carrier carrying the output gear, the pivot carrier movable between an engaged position in which the output gear is meshed with the main shaft gear, and a disengaged position in which the output gear is spaced from the main shaft gear;
    wherein in the engaged position a reverse power transmission path extends from the starter motor, through the reverse drive gear train to the main shaft, and wherein in the disengaged position the reverse power transmission path is broken.

2. The motorized vehicle of claim 1, wherein the reverse drive gear train includes an intermediate gear that rotates about a pivot axis, and wherein the pivot carrier is rotatable about the pivot axis between the engaged position and the disengaged position.

3. The motorized vehicle of claim 2, wherein the intermediate gear is in constant mesh with the output gear.

4. The motorized vehicle of claim 1, wherein during reverse operation the main shaft gear is coupled to one of the plurality of gears on the counter shaft to rotate the counter shaft.

5. The motorized vehicle of claim 1, wherein the pivot carrier is coupled to a control assembly, the control assembly including:
    a control rod extending between a first end and a second end,
    a control arm mounted for rotation about a control axis, and
    an actuator coupled to the control arm for rotation therewith.

6. The motorized vehicle of claim 5, wherein the second end of the control rod is coupled to the pivot carrier and the first end of the control rod is eccentrically coupled to the control arm, and wherein movement of the actuator rotates the control arm about the control axis, thereby moving the control rod to move the pivot carrier between the engaged position and the disengaged position.

7. The motorized vehicle of claim 5, wherein the actuator includes a lever arm movable by an operator of the motorized vehicle between a first position, in which the pivot carrier is in the disengaged position, and a second position, in which the pivot carrier is in the engaged position.

8. The motorized vehicle of claim 7, wherein the lever arm is coupled to one of a peg assembly configured to receive a foot of the operator or a handle assembly configured to receive a hand of the operator.

9. The motorized vehicle of claim 1, wherein the motor shaft of the starter motor extends between a first end and a second end, the first end selectively coupled to the engine to start the engine, and wherein the starter motor further comprises a reverse pinion coupled to the second end, and wherein the reverse pinion is in constant mesh with the reverse drive gear train.

10. The motorized vehicle of claim 9, wherein the starter motor further comprises a starter pinion coupled to the first end of the motor shaft for movement along the motor shaft between a first position and a second position, wherein in the first position the starter pinion couples the motor shaft to the engine and in the second position the starter pinion is disengaged from the engine.

11. The motorized vehicle of claim 10, wherein the starter pinion is movable between the first position and the second position by a solenoid.

12. A powertrain assembly for a motorized vehicle including an engine operable to drive the motorized vehicle in a forward direction, the powertrain assembly comprising:
    a starter motor having an output shaft extending between a first end and a second end, the first end selectively engageable with the engine to start the engine;
    a transmission having a main shaft with a main shaft gear and an output drive wheel; and
    a reverse drive assembly having an input and an output, the input in constant mesh with the second end of the starter motor, and the output selectively engageable with the main shaft gear of the transmission to drive the motorized vehicle in a reverse direction.

13. The powertrain assembly of claim 12, wherein the reverse drive assembly includes a pivot carrier movable between an engaged position and a disengaged position, and wherein the output includes an output gear supported on the pivot carrier, wherein in the engaged position the output gear is meshed with the main shaft gear to transmit power from the starter motor to the transmission, and in the disengaged position the output gear is spaced from the main shaft gear.

14. The powertrain assembly of claim 13, wherein the reverse drive assembly further includes an intermediate gear mounted for rotation about a pivot axis, wherein the pivot carrier is mounted for rotation about the pivot axis between the engaged position and the disengaged position, and wherein the intermediate gear is in constant mesh with the output gear.

15. The powertrain assembly of claim 13, wherein the pivot carrier is movable between the engaged position and the disengaged position by a control assembly including a control rod coupled to the pivot carrier, a control arm rotatable about a control axis and coupled to the control rod to translate the control rod, and an actuator coupled to the control arm to rotate the control arm about the control axis.

16. The powertrain assembly of claim 15, wherein the actuator includes a lever arm movable between a first position, in which the pivot carrier is in the disengaged position, and a second position, in which the pivot carrier is in the engaged position, and wherein a latch selectively secures the lever arm in one of the first position or the second position.

17. The powertrain assembly of claim 13, wherein the reverse drive assembly includes a reverse pinion mounted on the second end of the output shaft of the starter motor, a torque limiter configured to be driven by the reverse pinion, a reverse gear mounted for rotation about a pivot axis and driven to rotate by the torque limiter, a pivot shaft extending along the pivot axis rotatable with the reverse gear, and an intermediate gear mounted on the pivot shaft for corotation therewith, wherein the intermediate gear is in constant mesh with the output gear.

18. The powertrain assembly of claim 12, wherein the starter motor further includes a starter pinion coupled to the first end of the output shaft, the starter pinion movable along the output shaft between a first position, in which power from the starter motor is transmitted to the engine and a second position in which the starter pinion is disengaged from the engine, and wherein the starter pinion is movable by an electronic actuator.

19. The powertrain assembly of claim 18, wherein the starter motor further includes a reverse pinion fixed for rotation with the second end of the output shaft.

* * * * *